Patented Feb. 10, 1942

2,272,330

UNITED STATES PATENT OFFICE 2,272,330

METHOD OF MANUFACTURING DIELECTRICALLY HIGH-GRADE CERAMIC SUBSTANCES

Paul Schupp, Berlin-Siemensstadt, Germany, assignor to "Fides" Gesellschaft für die Verwaltung und Verwertung von gewerblichen Schutzrechten mit beschränkter Haftung, Berlin, Germany, a corporation of Germany No Drawing. Application July 18, 1938, Serial No. 219,924. In Germany July 16, 1937

8 Claims. (Cl. 106—46)

The present invention relates to a method of manufacturing dielectrically high-grade ceramic substances.

It is known in the art to manufacture ceramic masses for dielectric purposes from titanium dioxide (particularly rutile) and certain ceramic admixtures. These products, obtained according to the usual ceramic firing process, have the drawback that the dielectric loss angle increases considerably toward low frequencies. At the same time the dielectric constant varies with the frequency. Endeavors have been made to remove this drawback by adding zirconium oxide to the masses containing titanium dioxide, whereby the increase of the loss angle at low frequencies is prevented. This effect is due to the formation of mixed crystals between the titanium dioxides and the zirconium oxides. This method, however, requires considerable percentages of zirconium oxide in order to attain a satisfactory product. In this manner the percentage of titanium dioxide is materially reduced so that the final product presents a small dielectric constant.

An object of the present invention is to improve dielectric substances, consisting predominantly of titanium dioxide, by eliminating the increase of the loss angle at low frequencies while maintaining a high dielectric constant. The invention is based on the recognition that the increase of the loss angle toward low frequencies is caused by the presence of so-called faulty points in the lattice of the crystal of the titanium dioxide. It has been found that these faulty points cause the titanium dioxide to assume to a certain extent the properties of semi-conductors. These faulty points need not extend throughout the entire crystal of the titanium dioxide, but may be limited to some local areas so that points of relatively good conductivity occur within the otherwise good insulating material, which points are a deciding cause of the poor loss angle. A more particular object of the invention, therefore, is to prevent the formation of such faulty points or to reform already existing faulty points or points which occur during the pre-treatment of the titanium dioxide. According to the invention, an insulating mass, consisting predominantly of titanium dioxide in crystalline form and containing additive ceramic substances, after the preparation of the mixture, is burnt in an atmosphere which contains oxygen and is substantially free of reducing agents. The atmosphere may contain substances which during the burning process give off such a great amount of oxygen that the insulating mass is surrounded by an atmosphere containing oxygen and excluding reducing substances from the mass to be fired. By this method the faulty points in the titanium dioxide are reformed during the burning process by means of a considerable concentration of oxygen, and therefore the property of semi-conductivity partially inherent in the titanium dioxide crystal is eliminated or its occurrence prevented.

This effect may be explained as follows. The metal oxides behave differently as to the capability of their electrical conductivity of being influenced by oxygen. Tests have shown that the "reduction semi-conductors" to which titanium dioxide belongs conduct most poorly if they contain as great an amount of oxygen as possible. Such points in the oxide lattice which increase in number with decreasing percentage of oxygen are the cause of the conductivity. Since a decreasing outer oxygen pressure, according to thermo-dynamic laws, corresponds to an increasing partial pressure of the metallic component of the oxide, and since it must be assumed that the number of the metal atoms embedded in excess in the oxide increases and decreases in proportion to this metallic partial pressure, it may be concluded that the conductivity of the reduction semi-conductors is caused by an excess in metal atoms and disappears if the excess in metal disappears.

It should be noted that the foregoing explanation, when speaking of an excess in metal and of an enrichment of the oxide with oxygen within the range where the oxygen amount determines the occurrence of locally conductive areas, does not deal with a compounding process resulting in a new oxide phase, but concerns itself only with changes of the relative oxygen content of the crystal lattice within limits where the original oxide phase is maintained.

The method may be performed by heating the insulating mass in a closed chamber simultaneously with pure oxygen. Other gases may be added to the oxygen, provided they do not have reducing properties. Another way of embodying the invention consists in admixing materials to the insulating mass, which materials give off oxygen to such an extent that the titanium dioxide is practically always in an oxygen atmosphere during the burning process. It is not very important whether the substances yield their oxygen below or at the burning temperature of the insulating mass; it is only necessary that such an admixture be chosen which gives off a sufficient quantity of oxygen at the burning temperature and whose other properties do not materially impair the dielectric quality of the insulating mass. Suitable substances of such type are, for instance, superoxides such as barium peroxide, furthermore such metal oxides which present besides their most stable oxide phase a more highly oxidized phase which is instable at high temperatures. An example of the latter type is antimony pentoxide since it is converted into antimony tetroxide already at a temperature above 400 degrees centigrade, thus giving off oxygen. Such ceramic masses are particularly suitable for condensers for electrical communication purposes, since they are independent of the frequency.

The temperatures and heating periods to be applied in the above-described methods are similar to those customary in ceramic firing processes. For instance, a temperature between 1200 and 1400° C. may be employed during a period of several hours, depending upon the density and size of the product and the desired properties.

What is claimed is:

1. The method of manufacturing dielectrically high-grade ceramic materials which comprises firing a ceramic mixture consisting mainly of crystalline titanium dioxide in contact with an oxygen-rich atmosphere substantially free of reducing agents.

2. The method of producing ceramic dielectrics of high dielectric constant and low loss angle for condensers, which comprises firing a ceramic mixture containing a preponderant percentage of a crystalline metal oxide capable of assuming reduction semi-conductance, and exposing said mixture during the firing to an oxygen-rich atmosphere substantially free of reducing agents.

3. The method of producing ceramic dielectrics of high dielectric constant and low loss angle for condensers, which comprises admixing to a ceramic material containing a preponderant amount of titanium dioxide an oxygen-rich substance capable of giving off oxygen at high temperatures, and firing said mixture at a temperature where oxygen is liberated from said substance.

4. The method of producing dielectric ceramic materials of high dielectric constant and low loss angle, which comprises admixing to a ceramic mass consisting mainly of crystalline titanium dioxide an oxygen-rich substance capable of giving off oxygen at high temperature, and firing said mixture in an atmosphere substantially free of reducing agents at a temperature where oxygen is liberated from said substance.

5. The method of producing dielectric ceramic materials of high dielectric constant and low loss angle, which comprises admixing barium peroxide to a ceramic mass consisting mainly of crystalline titanium dioxide, and firing said mixture in an oxidizing atmosphere at a temperature where oxygen is liberated from said peroxide.

6. The method of producing dielectric ceramic materials of high dielectric constant and low loss angle, which comprises admixing to a ceramic mass consisting mainly of crystalline titanium dioxide an oxygen-rich metal oxide instable at high temperatures so as to disintegrate into a less oxidized phase under liberation of oxygen, and firing said mixture in an oxidizing atmosphere at a temperature where said instable oxide disintegrates.

7. The method of producing dielectric ceramic materials of high dielectric constant and low loss angle, which comprises admixing antimony pentoxide to a ceramic mass consisting mainly of crystalline titanium dioxide, and firing said mixture.

8. The method of manufacturing dielectrically high-grade ceramic materials which comprises firing a mass consisting mainly of crystalline titanium dioxide in a closed chamber and in contact with pure oxygen and under exclusion of reducing agents.

PAUL SCHUPP.